United States Patent
Epari

(10) Patent No.: US 11,877,036 B2
(45) Date of Patent: Jan. 16, 2024

(54) RENDERING SCROLLING CAPTIONS

(71) Applicant: ARRIS Enterprises LLC, Suwanee, GA (US)

(72) Inventor: Aurovind Sagar Epari, Karnataka (IN)

(73) Assignee: ARRIS Enterprises LLC, Suwanee, GA (US)

(*) Notice: Subject to any disclaimer, the term of this patent is extended or adjusted under 35 U.S.C. 154(b) by 3 days.

(21) Appl. No.: 17/573,697

(22) Filed: Jan. 12, 2022

(65) Prior Publication Data

US 2022/0224988 A1 Jul. 14, 2022

Related U.S. Application Data

(60) Provisional application No. 63/136,748, filed on Jan. 13, 2021.

(51) Int. Cl.
*H04N 21/488* (2011.01)
*H04N 21/426* (2011.01)
*H04N 21/44* (2011.01)

(52) U.S. Cl.
CPC ... *H04N 21/4884* (2013.01); *H04N 21/42653* (2013.01); *H04N 21/44004* (2013.01); *H04N 21/44008* (2013.01)

(58) Field of Classification Search
CPC ......... H04N 21/4884; H04N 21/42653; H04N 21/44004; H04N 21/44008
See application file for complete search history.

(56) References Cited

U.S. PATENT DOCUMENTS

2010/0042924 A1 2/2010 Kim et al.
2013/0002705 A1* 1/2013 Cornell .................. G06T 11/20
 345/617

(Continued)

FOREIGN PATENT DOCUMENTS

KR 10-2009-0067220 A 6/2009
KR 10-2014-0015578 A 2/2014
KR 10-2014-0079989 A 6/2014

OTHER PUBLICATIONS

Joey De Vries, Text Rendering, learnopengl.com (LearnOpenGL-Text Rendering), pp. 1-9, Dec. 22, 2020 [retrieved on: Apr. 13, 2022], Retrieved from: <https://web.archive.org/web/20201222002535/https://learnopengl.com/In-Practice/Text-Rendering>.

(Continued)

*Primary Examiner* — Jefferey F Harold
*Assistant Examiner* — Alexander Boyd
(74) *Attorney, Agent, or Firm* — Panitch Schwarze Belisario & Nadel LLC

(57) ABSTRACT

A method, system, and computer program product for rendering scrolling captions for media content includes a processor to receive a first request to display a first line of text associated with a media file. The processor may generate a framebuffer object (FBO) and a first texture per-line (TPL) for the first line of text. The processor may draw one or more glyphs on the first TPL, and render the first TPL in a first position of the FBO. The processor may receive a second request to display a second line of text. The processor may generate a second TPL for the second line of text, draw one or more glyphs on the second TPL, render the first TPL in a second position and the second TPL in the first position.

20 Claims, 7 Drawing Sheets

(56) References Cited

U.S. PATENT DOCUMENTS

2014/0157149 A1 6/2014 Nishizawa et al.
2018/0018806 A1* 1/2018 Li .......................... G06T 19/20

OTHER PUBLICATIONS

Rone Park Subtitle Lab, Easily create scrolling subtitles that flow through the premiere subtitles basic screen, Youtube, Aug. 22, 2019 [retrieved on: Apr. 13, 2022], Retrieved from: <https://www.youtube.com/watch?v=nlOxuZsadDw> scripts 03:42-03:54.

Notification of Transmittal of the International Search Report (Forms PCT/ISA/220 and PCT/ISA/210) and the Written Opinion of the International Searching Authority (Form PCT/ISA/237) dated May 10, 2022, by the International Application Division Korean Intellectual Property Office in corresponding International Application No. PCT/US2022/012026. (9 pages).

* cited by examiner

RENDERING SCROLLING CAPTIONS

FIELD OF THE DISCLOSURE

The present disclosure relates generally to a method, system, and computer program product for rendering caption scrolling, and more particularly to rendering caption scrolling using per line texture in OpenGL for Embedded Systems (ES).

BACKGROUND

Captioning is the process of displaying text on a display device. Typically, captions are a transcription of the audio portion of a media program, media stream, or other media content and may include descriptions of non-speech elements. At a high level, caption display can be divided into 2 types: non-scrolling captions and scrolling captions. Non-scrolling captions are captions which appear on the display device line by line, with the previous line disappearing before the next line is displayed. Scrolling captions also appear line by line, but the previous line scrolls to a different position, as opposed to disappearing, to allow a new line to be displayed simultaneously. Thus, scrolling captions allow for multiple lines to be displayed simultaneously with older lines disappearing from view after a set number of new lines have been displayed. There are various methods for rendering captions for a media program or media stream such as stenocaptioning, respeaking, speech recognition technology, etc. OpenGL ES is a computer graphics rendering application programming interface (API) for rendering 2D and 3D computer graphics. Currently, it is a known fact that text rendering is not directly supported by OpenGL ES. Thus, to render text using OpenGL ES, developers use libraries such as FreeType to get the bitmaps and then use OpenGL APIs to create the textures (managed by GPU) for the text to be rendered. For scrolling captions, one of the widely used processes in OpenGL is to draw all the texts/glyphs at the new position, e.g. drawing them one line above the previous position. However, this can be problematic in embedded devices, e.g., set-top boxes, as (re)-rendering all the texts/glyphs can make rendering slow and may therefore impact the viewing experience as the rendered captions may not align with the audio of the media program/media stream. In general, if lots of texts/glyphs are to be rendered then Framebuffer Objects or off-screen buffers are used. However, in the case of scrolling captions, the re-drawing of all texts/glyphs still needs to be done and hence can impact the viewing experience. Thus, there is a need for a technical solution for more efficient rendering of scrolling captions using OpenGL such that the rendered captions align with the audio portion of the media program/media stream.

SUMMARY OF THE DISCLOSURE

The present disclosure provides a description of exemplary methods, systems, and computer program products for rendering scrolling captions. The methods, systems, and computer program products may include a processor which can receive a first request to display a first line of text associated with a media file. The processor may generate a framebuffer object (FBO). The FBO may be an active framebuffer for the media file. The processor may generate a first texture per-line (TPL) for the first line of text, draw one or more glyphs on the first TPL, and render the first TPL in a first position of the FBO. The processor may display the first TPL on a display at the first position. The processor may receive second request to display a second line of text associated with the media file. The processor may generate a second texture per-line (TPL) for the second line of text, draw one or more glyphs on the second TPL, and render the first TPL in a second position and the second TPL in the first position. The processor may display the second TPL on the display in the first position and the first TPL in the second position. The processor may further store the first TPL and the second TPL in an active TPL list, the active TPL list stored in a memory of the computing device. The processor may further determine the second position is not visible on the display, and remove the first TPL from the active TPL list.

BRIEF DESCRIPTION OF THE DRAWINGS

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure

DETAILED DESCRIPTION OF THE PREFERRED EMBODIMENTS AND METHODS

The present disclosure provides a novel solution for rendering scrolling captions. In particular, the present disclosure provides a novel solution for rendering scrolling captions using OpenGL. Currently, one of the widely used processes in OpenGL is to draw all the texts/glyphs at the new position, e.g., drawing them one line above the previous position. However, this current method of rendering scrolling captions using OpenGL requires (re)-rendering all the texts/glyphs in new positions, which can make rendering slow. Therefore, current methods impact the viewing experience as the rendered captions may not align with the audio of the media program/media stream due to the time required to re-render the glyphs. The methods, systems, and computer program products herein provide a novel solution, not addressed by current technology, by enabling rendering of scrolling captions without having to re-draw all the glyphs. Exemplary embodiments of the methods, systems, and computer program products provided for herein utilize texturesper-line to render the glyphs associated with the captions for a media file. Thus, the methods, systems, and computer program products provided for herein provide a novel way for rendering scrolling captions such that glyphs are only rendered once onto their respective texture-per-line.

System for Rendering Scrolling Captions

Figure 1A:
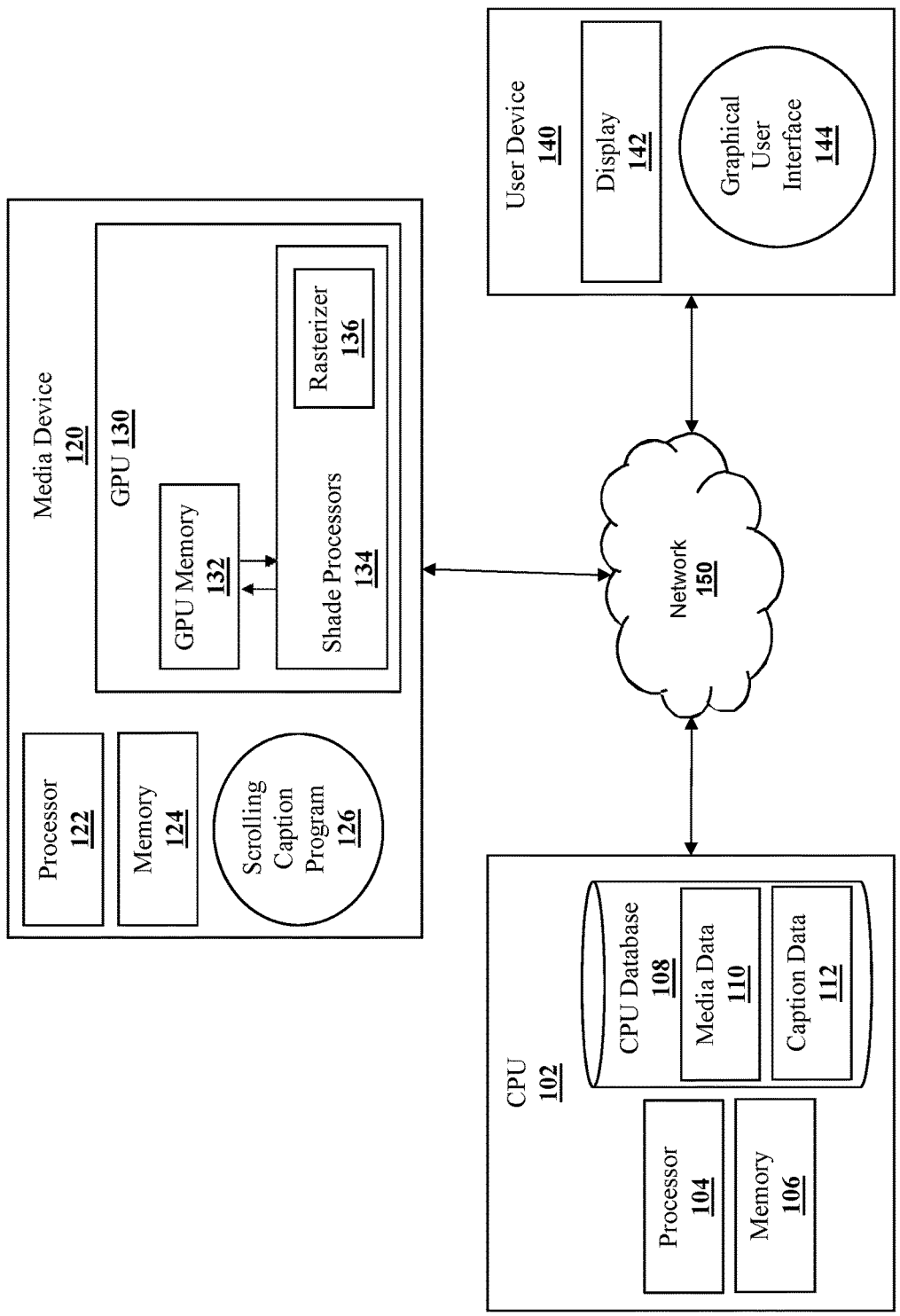
FIG. 1a is a block diagram that illustrating a high-level system architecture for rendering scrolling captions in accordance with exemplary embodiments.

FIG. 1a illustrates an exemplary system 100 for rendering scrolling captions. The system 100 includes a computer processing unit (CPU), a media device 120, and user device 140 communicating via a network 150.

The CPU 102 includes, for example, a processor 104, a memory 106, and a CPU database 108. The CPU 102 may be any type of electronic device or computing system specially configured to perform the functions discussed herein, such as the computing system 400 illustrated in FIG. 4. Further, it can be appreciated that the CPU 102 may include one or more computing devices. In an exemplary embodiment of the system 100, the CPU 102 is a server associated with any media services provider providing media content to one or more users. While the CPU 102 is illustrated separate from the media device 120, it can be appreciated that the CPU 102 and the media device 120 may be a single device. Further, it can be appreciated that the CPU 102, the media device 120, and the user device 140 may be a single device.

The processor 104 may be a special purpose or a general purpose processor device specifically configured to perform the functions discussed herein. The processor 104 unit or device as discussed herein may be a single processor, a plurality of processors, or combinations thereof. Processor devices may have one or more processor "cores." In an exemplary embodiment, the processor 104 is configured to perform the functions associated with the CPU 102.

The memory 106 can be a random access memory, read-only memory, or any other known memory configurations. Further, the memory 106 can include one or more additional memories including the CPU database 108 in some embodiments. The memory 106 and the one or more additional memories can be read from and/or written to in a well-known manner. In an embodiment, the memory 106 and the one or more additional memories can be non-transitory computer readable recording media. Memory semiconductors (e.g., DRAMs, etc.) can be means for providing software to the computing device such as the CPU 102. Computer programs, e.g., computer control logic, can be stored in the memory 106.

The CPU database 108 can include media data 110 and caption data 112. The CPU database 108 can be any suitable database configuration, such as a relational database, a structured query language (SQL) database, a distributed database, or an object database, etc. Suitable configurations and storage types will be apparent to persons having skill in the relevant. In an exemplary embodiment of the system 100, the CPU data base 108 stores media data 110 and caption data 112. The media data 110 can be any video file such as, but not limited to, movies, television episodes, music videos, or any other suitable media file, etc. Further, the media data 110 may be any suitable file format such as, but not limited to, .WEBM, .MPG, .MP2, .MPEG, .MPE, .MPV, .OGG, .MP4, .M4P, .M4V, .AVI, .WMV, .MOV, .QT, .FLV, .SWF, and AVCHD, etc. In an exemplary embodiment, the media data 110 may be selected by a user on the user devices 140 and displayed on a display of the user devices 120a-n. For example, but not limited to, the user may select a media file for play via a media services platform, or by tuning to a television channel playing the media file, etc. The caption data 112 may be caption data associated with the media data 110. For example, the caption data 112 may be a transcription of the audio content of the media data 110. The caption data 112 may be transmitted to the media device 120 with the media data 110.

The media device 120 includes, for example, a processor 122, a memory 124, the scrolling caption program 126, and a graphics processing unit (GPU) 130. The media device 120 CPU 102 may be any type of electronic device or computing system specially configured to perform the functions discussed herein, such as the computing system 400 illustrated in FIG. 4. Further, it can be appreciated that the media device 120 may include one or more computing devices such as, but not limited to, the CPU 102, and the user device 140, etc. In an exemplary embodiment of the system 100, the media device 120 is a set-top-box device or any suitable device capable of receiving and transmitting the media data 110 and the caption data 112 to and from the devices of the system 100 such as the CPU 102 and the user device 140. While the media device 120 is illustrated separate from the CPU 102, it can be appreciated that the media device 120 and the CPU 102 may be a single device. Further, it can be appreciated that the media device 120, the CPU 102, and the user device 140 may be a single device.

The processor 122 may be a special purpose or a general purpose processor device specifically configured to perform the functions discussed herein. The processor 122 unit or device as discussed herein may be a single processor, a plurality of processors, or combinations thereof. Processor devices may have one or more processor "cores." In an exemplary embodiment, the processor 122 is configured to perform the functions associated with the modules of the scrolling caption program 126 as discussed below with reference to FIGS. 2a-4.

The memory 124 can be a random access memory, read-only memory, or any other known memory configurations. Further, the memory 124 can include one or more additional memories in some embodiments. The memory 124 and the one or more additional memories can be read from and/or written to in a well-known manner. In an embodiment, the memory 124 and the one or more additional memories can be non-transitory computer readable recording media. Memory semiconductors (e.g., DRAMs, etc.) can be means for providing software to the computing device such as the scrolling caption program 124. In an exemplary embodiment, the memory 124 may store the media data 110 and the caption data 112 received from the CPU 102. Computer programs, e.g., computer control logic, can be stored in the memory 124.

Figure 1B:
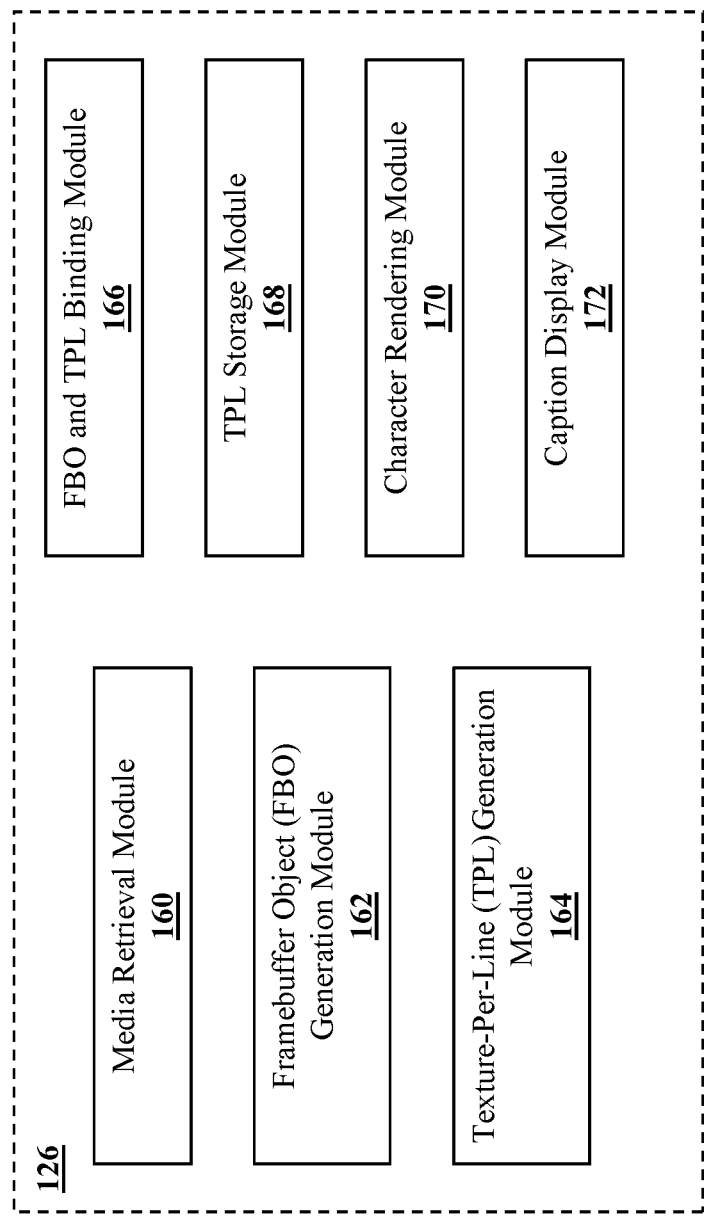
FIG. 1b illustrates example operating modules of the scrolling caption program of FIG. 1a in accordance with exemplary embodiments.
Figure 2A:
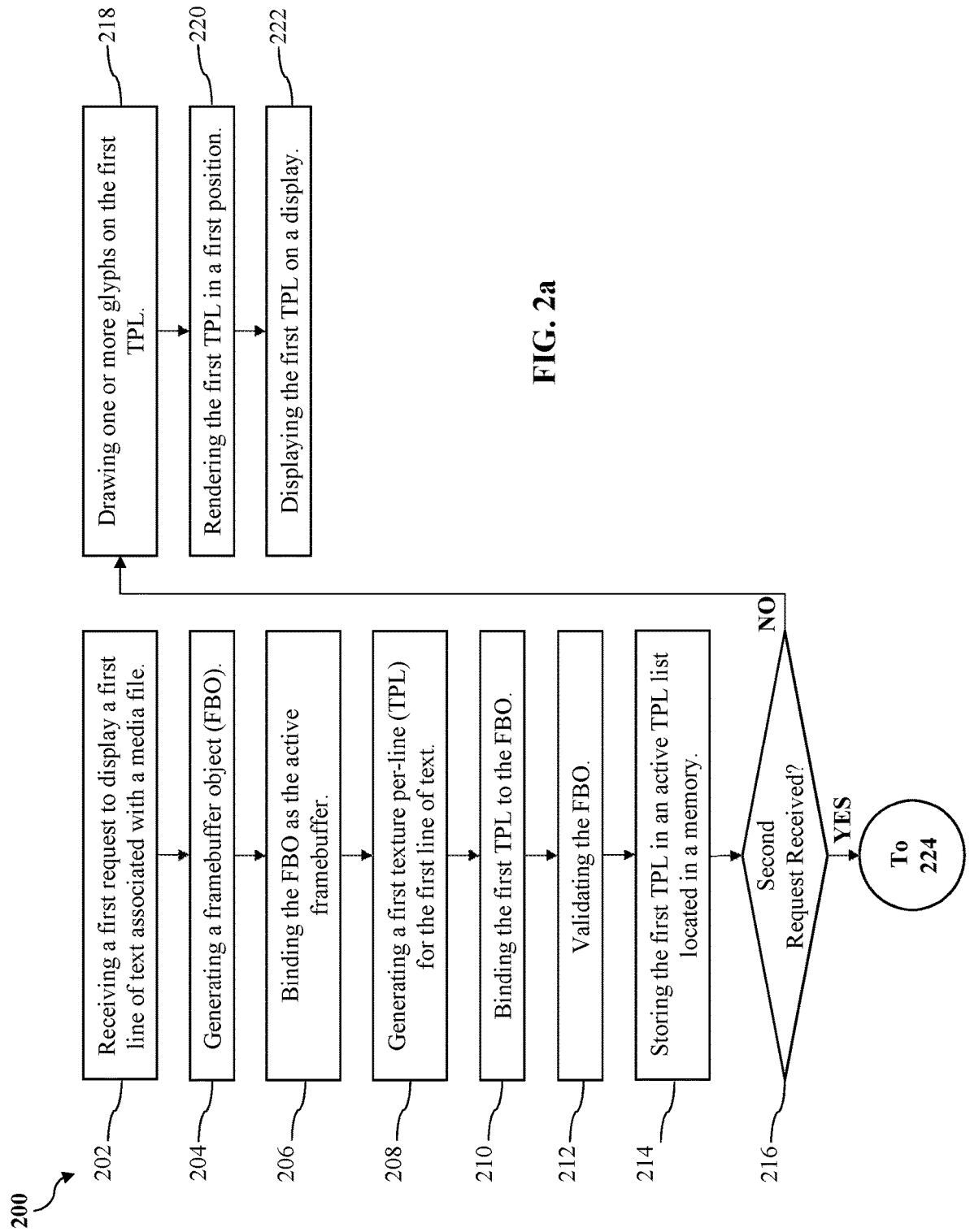
FIG. 2a is a flow chart illustrating exemplary methods for rendering scrolling captions in accordance with exemplary embodiments.
Figure 2B:
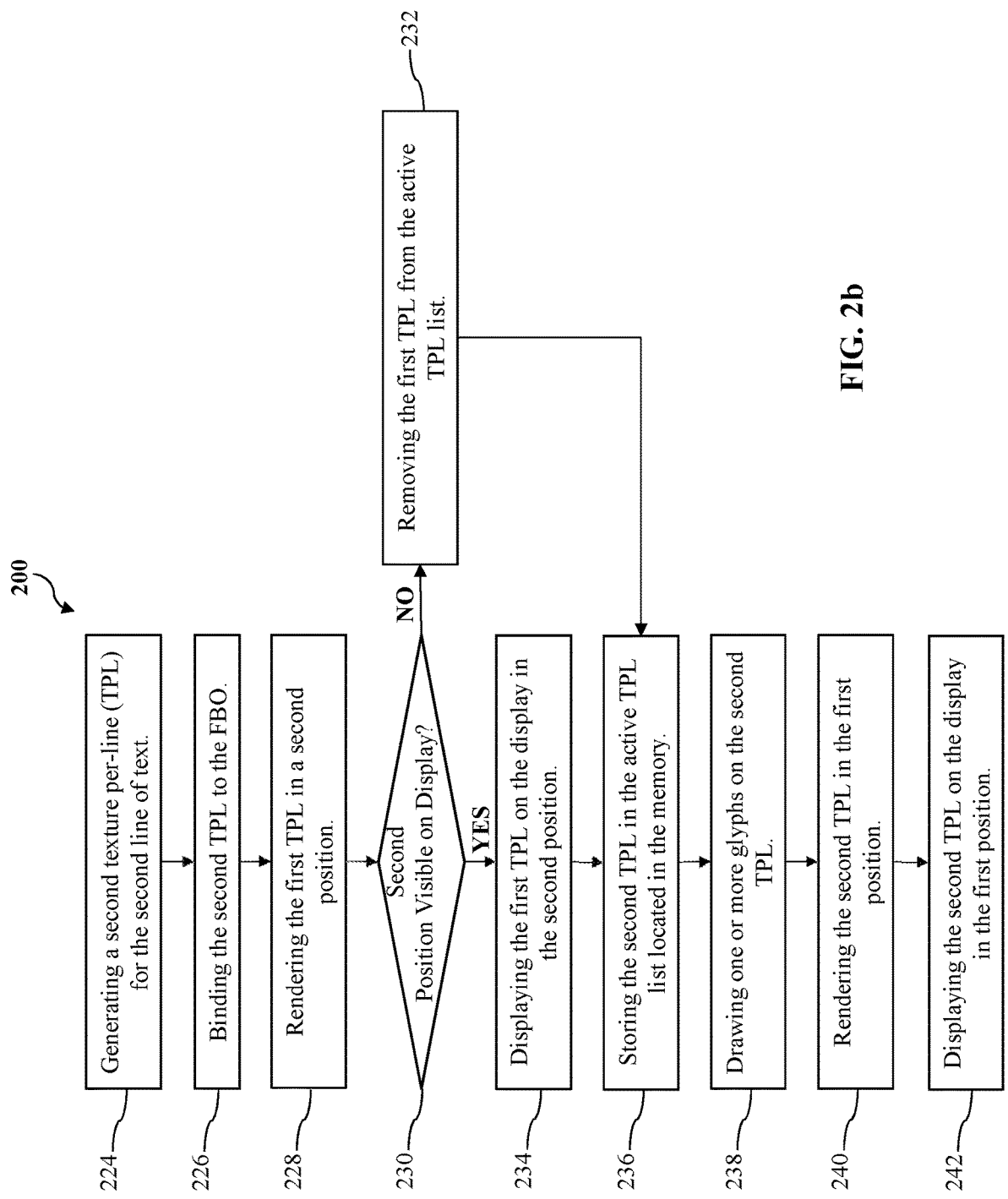
FIG. 2b is a flow chart illustrating exemplary methods for rendering scrolling captions in accordance with exemplary embodiments.

The scrolling caption program 126 can include the media retrieval module 160, the framebuffer object (FBO) generation module 162, the texture-per-line (TPL) generation module 164, the FBO and TPL binding module 166, the TPL storage module 168, the character rendering module 170, and the caption display module 172 as illustrated in FIG. 1b. The scrolling caption program 126 is a computer program specifically programmed to implement the methods and functions disclosed herein for rendering scrolling captions. The scrolling caption program 126 and the modules 160-172 are discussed in more detail below with reference to FIGS. 1b-4.

The GPU 130 can include a GPU memory 132, shade processors 134, and rasterizer 136. The GPU 130 may be a special purpose circuit specifically configured to perform the functions discussed herein. The GPU 130 is capable of manipulating and altering memory, e.g. the memory 124, to accelerate the creation of images in a frame buffer intended for output to a display device, e.g. the display 142. The GPU 130 may be, but is not limited to, a dedicated graphics card, an integrated graphics processing unit, a hybrid graphics processing unit, a general purpose graphics processing unit (GPGPU), or an external GPU.

The GPU memory 132 may be a random access memory (RAM) or a video RAM. Further, the GPU memory 132 can include one or more additional memories in some embodiments. The GPU memory 132 and the one or more additional memories can be read from and/or written to in a well-known manner. In an embodiment, the GPU memory 132 and the one or more additional memories can be non-transitory computer readable recording media. Memory semiconductors (e.g., DRAMs, etc.) can be means for providing software or application programming interfaces (APIs) to the GPU 130 such as OpenGL, OpenGL for Embedded Systems (GLES), or any other suitable software or API for rendering graphics, etc. OpenGL is a cross-language, cross-platform API for rendering 2D and 3D vector graphics. The OpenGL API interacts with the GPU 130 to achieve hardware-accelerated rendering. In an exemplary embodiment, the GPU memory 132 may store frame buffers and textures received from software on the media device 120 such as the scrolling caption program 126 and provide the OpenGL or GLES API to the GPU 130.

The shade processors 134 are programs resident on the GPU 130 that receive inputs, e.g., the textures generated by the scrolling caption program 126, and transform those inputs into outputs for display. The shade processors 134 include one or more algorithms that alter the position and color, e.g., hue, saturation, brightness, and contrast, of all pixels, vertices, and/or textures of rendered images, e.g., textures generated for captions by the scrolling caption program 126. The shade processors 134 can include one or more types of shade processors such as, but not limited to, vertex processors, pixel processors, geometry processors, tessellation processors, and primitive processors, etc. In an exemplary embodiment, the shade processors 134 draw glyphs or characters onto the textures generated by the scrolling caption program 126. The shade processors 134 can also include a rasterizer 136. Rasterizer 136 renders the textures into a raster image to be displayed on a display device, e.g., the display 142 of the user device 140.

The user device 140 can include a display 142 and a graphical user interface 144. The user device 140 may be a desktop computer, a notebook, a laptop computer, a tablet computer, a handheld device, a smart-phone, a thin client, smart television, or any other electronic device or computing system capable of storing, compiling, and organizing audio, visual, or textual data and receiving and sending that data to and from other computing devices, such as the CPU 102, and the media device 120 via the network 150. Further, it can be appreciated that the user device 140 may include one or more computing devices. While the user device 140 is illustrated separate from the media device 120, it can be appreciated that the user device 140 and the media device 120 may be a single device. Further, it can be appreciated that the user device 140, the media device 120, and the CPU 102 may be a single device.

The display 142 can be any display capable of receiving display signals from another computing device, such as the user device 140, the media device 120, and/or the CPU 102, and outputting those display signals to a display unit such as, but not limited to, a LCD screen, plasma screen, LED screen, DLP screen, CRT screen, etc. While the display 142 is illustrated a part of the user device 140, the components of the user device 140 can be part of the media device 120 or separate devices.

The graphical user interface 144 can include components used to receive input from the user devices 120*a-n* and transmit the input to the scrolling caption program 126, or conversely to receive information from the scrolling caption program 126 and display the information on the user device 140, e.g., via the display 142. In an example embodiment, the graphical user interface 144 uses a combination of technologies and devices, such as device drivers, to provide a platform to enable a user of the user device 140 to interact with the scrolling caption program 126. In the example embodiment, the graphical user interface 144 receives input from a physical input device, such as a keyboard, mouse, touchpad, touchscreen, camera, microphone, remote, etc. For example, the graphical user interface 144 may receive a user selection to display captions associated with media content being displayed on the user device 140.

The network 150 may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. In general, the network 150 can be any combinations of connections and protocols that will support communications between the CPU 102, the media device 120, and the user device 140. In some embodiments, the network 150 may be optional based on the configuration of the CPU 102, the media device 120, and the user device 140.

An Exemplary Method for Rendering Scrolling Captions

FIG. 2 illustrates a flow chart of an exemplary method 200 for rendering scrolling captions for media content in accordance with exemplary embodiments.

In an exemplary embodiment, the method 200 can include block 202 for receiving, e.g., by the scrolling caption program 126 on the media device 120, a first request, e.g., from the user device 140, to display, e.g. on the display 142, a first line of text associated with a media file. The media file may be stored in the CPU database 108 as media data 110 and have associated caption data 112. For example, a user may select, e.g. via the graphical user interface 144, a media file for viewing on the user device 140. The user may further select closed captioning for the media file being viewed on the user device 140. The selection of closed captioning for the media file results in the requests for the lines of text associated with the audio of the media file, e.g. the caption data 112. In an exemplary embodiment of the system 100, the media retrieval module 160 can be configured to execute the method of block 202.

In an exemplary embodiment, the method 200 can include block 204 for generating a framebuffer object (FBO) for the media file. A framebuffer is a collection of buffers that can be used as the destination for rendering. For example, OpenGL has two kinds of framebuffers: the Default Framebuffer, which is provided by the OpenGL Context, and user-created framebuffers called Framebuffer Objects (FBOs). The buffers for default framebuffers are part of the context and usually represent a window or display device, e.g., the display 142. The buffers for FBOs reference images from either textures or renderbuffers, but they are never directly visible. Buffers refer to a specific location in the framebuffer and an image may or may not be associated with a particular buffer in a framebuffer. Buffers in FBOs are also called "attachment points" which are locations where images can be attached. The buffers of FBOs may include color buffers, depth buffers, and/or stencil buffers. In an exemplary embodiment, the FBO generated in block 204 includes a texture for color attachment. In an exemplary embodiment of the system 100, the framebuffer object (FBO) generation module 162 can be configured to execute the method of block 204.

In an exemplary embodiment, the method 200 can include block 206 for binding the FBO as the active framebuffer for the media file. Binding an FBO as the active framebuffer mean the FBO is bound to the context of the default framebuffer for the media file. FBO binding may be accomplished using any well-known method including using the application program interface OpenGL or GLES, etc. In an exemplary embodiment of the system 100, the framebuffer object (FBO) generation module 162 can be configured to execute the method of block 206.

In an exemplary embodiment, the method 200 can include block 208 for generating, e.g., using the scrolling caption program 126, a first texture per-line (TPL) for the first line of text, e.g. a line of the caption data 112. A texture is an object that contains some number of images, e.g., a two-dimensional array of pixels. Thus, the TPL is a two-dimensional array of pixels associated with the first line of text. The first line may be the caption for the first line of audio of the media file. It can be appreciated that the first line does not necessarily correspond to the first line of audio of the media file, but may be the first line of audio at the time the user selects closed captioning for the media file. In an exemplary embodiment of the system 100, the texture-per-line (TPL) generation module 164 can be configured to execute the method of block 208.

In an exemplary embodiment, the method 200 can include block 210 for binding the first TPL to the FBO. TPL binding may be accomplished using any well-known method including using the application program interface OpenGL or GLES, etc. In an exemplary embodiment of the system 100, the FBO and TPL Binding Module 166 can be configured to execute the method of block 210.

In an exemplary embodiment, the method 200 can include block 212 for validating the FBO. FBO validation may be accomplished using any well-known method including using the application program interface OpenGL or GLES. In an exemplary embodiment of the system 100, the framebuffer object (FBO) generation module 162 can be configured to execute the method of block 212.

In an exemplary embodiment, the method 200 can include block 214 for storing the first TPL in an active TPL list located in a memory, e.g., the memory 124 of the media device 120. The active TPL list may include TPL for any line of text associated with the media file being displayed, e.g., on the display 142. The media file and/or the display 142 may be configured to display a certain number of lines of closed captioning, e.g., the caption data 112, simultaneously. For example, the media file and/or the display 142 may be configured to display one line, two lines, three lines, etc. of text simultaneously and the active TPL list will store the TPLs associated with each line being displayed. In an exemplary embodiment of the system 100, the TPL storage module 168 can be configured to execute the method of block 214.

In an exemplary embodiment of the method 200 if a second request for a second line of text is received, e.g. from the user device 140, to display, e.g., on the display 142, a second line of text associated with the media file, the method 200 may proceed to blocks 224-242. If no second request is received, the method 200 may proceed to blocks 218-222. In an exemplary embodiment of the system 100, the media retrieval module 160 can be configured to execute the method of block 216.

In an exemplary embodiment, the method 200 can include block 218 for drawing one or more glyphs on the first TPL. The one or more glyphs may correspond to each of the characters, e.g. letters, numbers, symbols, etc., of the first line of text. In exemplary embodiment the one or more glyphs of the first line of text are drawn onto the first TPL by the shade processors 134 of the GPU 130. In an exemplary embodiment of the system 100, the character rendering module 170 can be configured to execute the method of block 218.

Figure 3A:
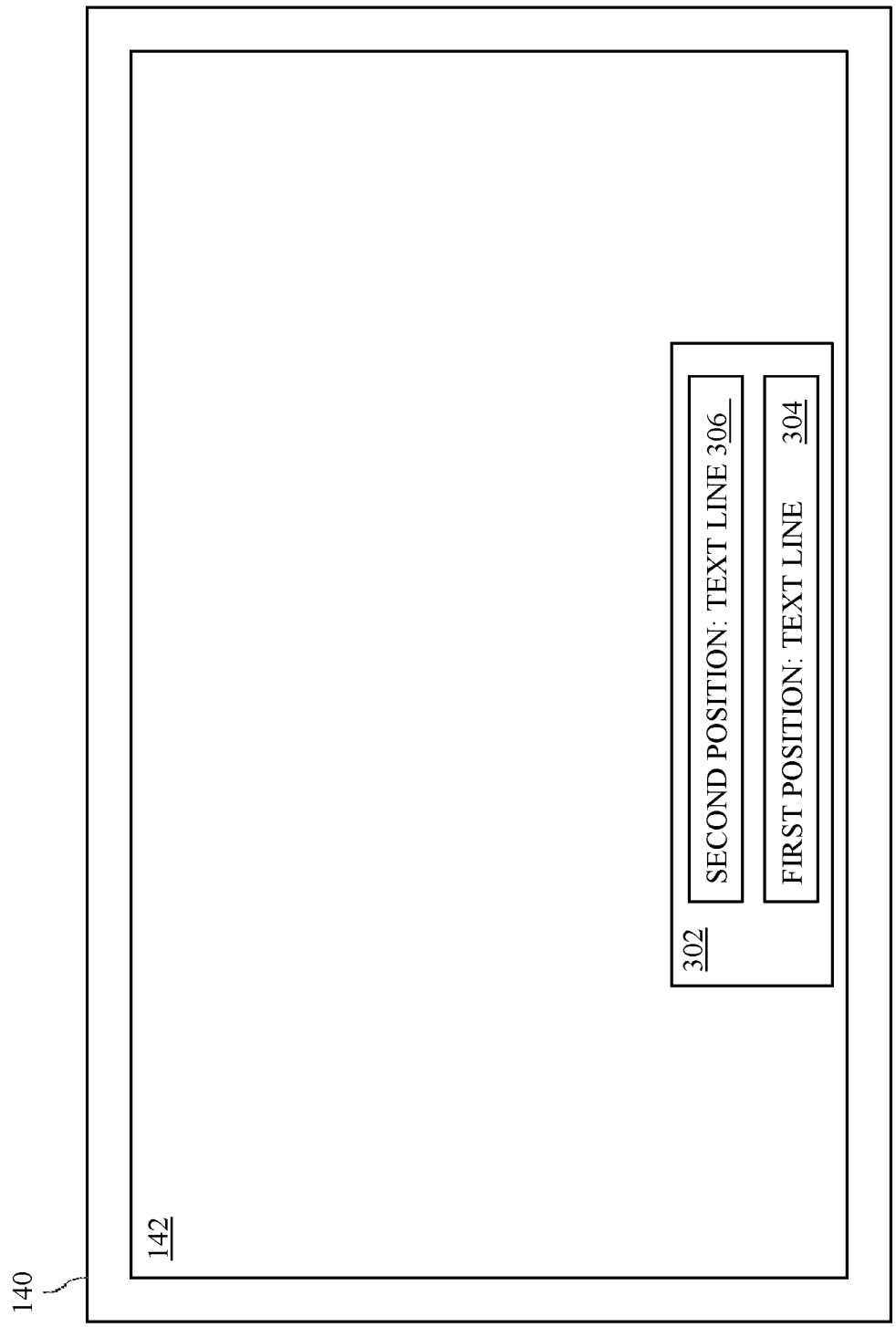
FIG. 3a illustrates an example display with captions in accordance with exemplary embodiments.
Figure 3B:
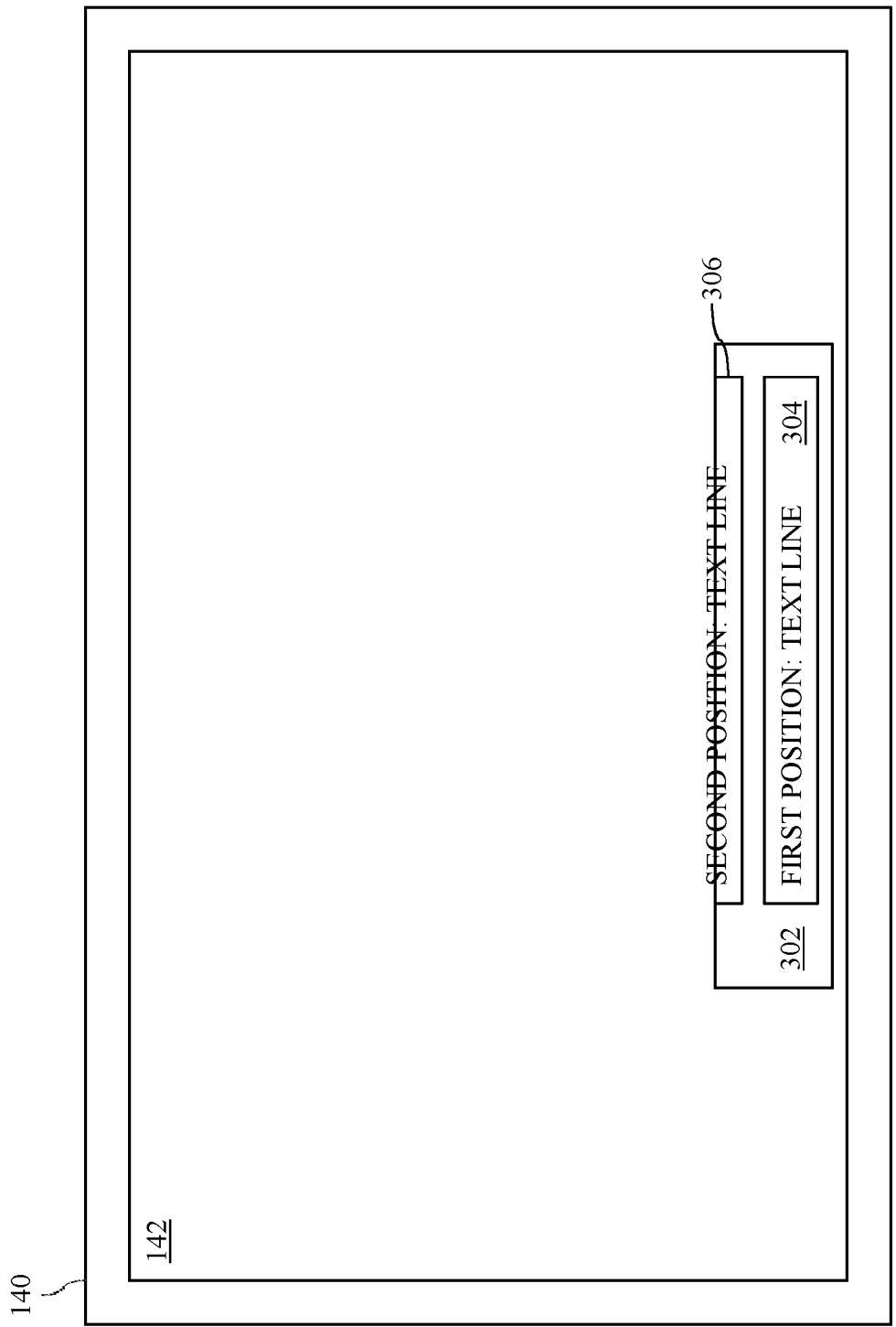
FIG. 3b illustrates an example display with captions in accordance with exemplary embodiments.

In an exemplary embodiment, the method 200 can include block 220 for rendering the first TPL in a first position of the FBO for display. The first TPL may be rendered by the rasterizer 136. The rasterizer 136 renders the TPL into a raster image to be output to a display device, e.g., the display 142 of the user device 140. The first position of the FBO may correspond to the first position 304 in the caption display area 302 of the display 142 as illustrated in FIG. 3a. In an exemplary embodiment of the system 100, the character rendering module 170 can be configured to execute the method of block 220.

In an exemplary embodiment, the method 200 can include block 222 for displaying the first TPL on a display, e.g., the display 142, in the first position. For example, the first line of text of the media file may be displayed to the user on the user device 140 via the display 142. In an exemplary embodiment of the system 100, the caption display module 172 can be configured to execute the method of block 222.

In an exemplary embodiment, the method 200 can include block 224 for generating a second texture per-line (TPL) for the second line of text. The second TPL generated in block 224 is generated similar to the first TPL in block 208. The second line of text may be the caption for the second line of audio of the media file. It can be appreciated that the second line does not necessarily correspond to the second line of audio of the media file, but may be the second line of audio at the time the user selects closed captioning for the media file. In an exemplary embodiment of the system 100, the texture-per-line (TPL) generation module 164 can be configured to execute the method of block 224.

In an exemplary embodiment, the method 200 can include block 226 for binding the second TPL to the FBO. TPL binding may be accomplished using any well-known method including using the application program interface OpenGL or GLES, etc. In an exemplary embodiment of the system 100, the FBO and TPL Binding Module 166 can be configured to execute the method of block 226.

In an exemplary embodiment, the method 200 can include block 228 for rendering the first TPL in a second position of the FBO. The first TPL may be rendered in the second position by the rasterizer 136. The rasterizer 136 renders the TPL into a raster image to be output to a display device, e.g. the display 142 of the user device 140. The second position of the FBO may correspond to the second position 306 in the caption display area 302 of the display 142 as illustrated in FIG. 3a. Rendering the first TPL in the second position of the FBO updates the main texture of the FBO and does not require the one or more glyphs of the first TPL to be re-drawn. In an exemplary embodiment of the system 100, the character rendering module 170 can be configured to execute the method of block 228.

In an exemplary embodiment, the method 200 can include block 230 for determining if the second Position of the FBO is visible on the display, e.g., the display 142 of the user device 140. If the second position is not visible on the display 142, the method 200 removes the first TPL from the active TPL list at block 232 and then proceeds to blocks 236-242. If the second position is visible on the display 142, the method 200 proceed to blocks 234-242. In an exemplary embodiment of the system 100, the caption display module 172 can be configured to execute the method of block 230 and the TPL storage module 168 can be configured to execute the method of block 232.

In an exemplary embodiment, the method 200 can include block 234 for displaying the first TPL on the display, e.g., the display 142, in the second position. For example, the first TPL may move from the first position 304 to the second position 306 of the display area 302 of the display 142 as illustrated in FIG. 3a. Further, the second position 306 may be fully visible as in FIG. 3a or only partially visible as in FIG. 3b. For example, the user viewing the display 142 may perceive the first TPL moving from the first position to the second position as scrolling of the first line of text, i.e., scrolling captions. In an exemplary embodiment of the system 100, the caption display module 172 can be configured to execute the method of block 234.

In an exemplary embodiment, the method 200 can include block 236 for storing the second TPL in the active TPL list located in a memory, e.g. the memory 124 of the media device 120. The method of block 236 is similar to the method of block 214. In an exemplary embodiment of the system 100, the TPL storage module 168 can be configured to execute the method of block 236.

In an exemplary embodiment, the method 200 can include block 238 for drawing one or more glyphs on the second TPL. The one or more glyphs may correspond to each of the characters, e.g. letters, numbers, symbols, etc., of the second line of text. In exemplary embodiment the one or more glyphs of the second line of text are drawn onto the second TPL by the shade processors 134 of the GPU 130. In an exemplary embodiment of the system 100, the character rendering module 170 can be configured to execute the method of block 238.

In an exemplary embodiment, the method 200 can include block 240 for rendering the second TPL in the first position. The second TPL may be rendered by the rasterizer 136. The rasterizer 136 renders the TPL into a raster image to be output to a display device, e.g. the display 142 of the user device 140. The first position of the FBO may correspond to the first position 304 in the caption display area 302 of the display 142 as illustrated in FIG. 3a. In an exemplary embodiment of the system 100, the character rendering module 170 can be configured to execute the method of block 240.

In an exemplary embodiment, the method 200 can include block 242 for displaying the second TPL on the display in the first position. For example, the second line of text of the media file may be displayed to the user on the user device 140 via the display 142. In an exemplary embodiment of the system 100, the caption display module 172 can be configured to execute the method of block 242.

Computer System Architecture

Figure 4:
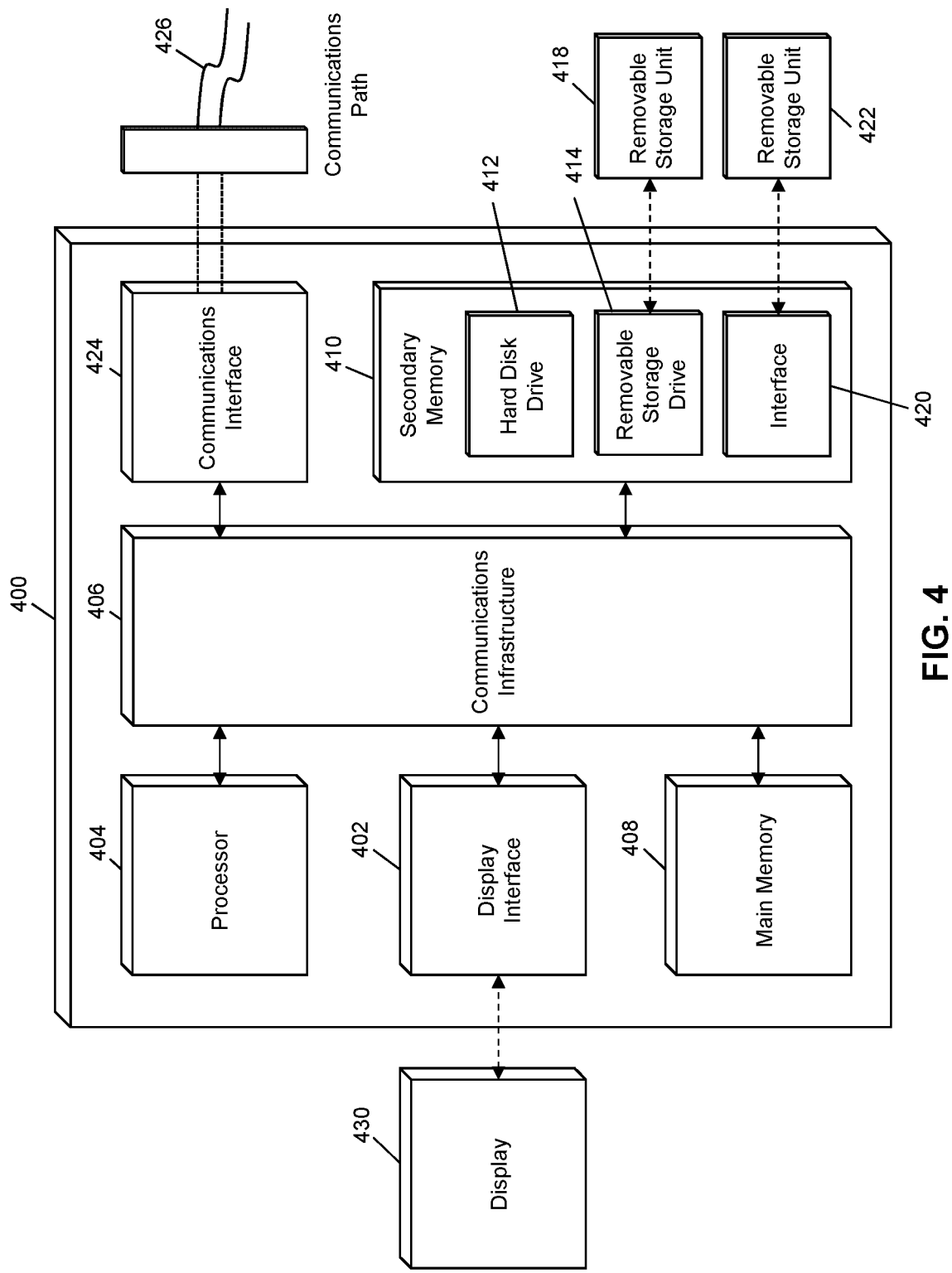
FIG. 4 is a block diagram illustrating a computer system architecture in accordance with exemplary embodiments.

FIG. 4 illustrates a computer system 400 in which embodiments of the present disclosure, or portions thereof, may be implemented as computer-readable code. For example, the CPU 102, the media device 120, and the user device 140 of FIG. 1a may be implemented in the computer system 400 using hardware, software executed on hardware, firmware, non-transitory computer readable media having instructions stored thereon, or a combination thereof and may be implemented in one or more computer systems or other processing systems. Hardware, software, or any combination thereof may embody modules, such as the modules 160-172 of FIG. 1b, and components used to implement the method of FIGS. 2a-2b.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 418, a removable storage unit 422, and a hard disk installed in hard disk drive 412.

Various embodiments of the present disclosure are described in terms of this example computer system 400. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 404 may be a special purpose or a general purpose processor device specifically configured to perform the functions discussed herein. The processor device 404 may be connected to a communications infrastructure 406, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 400 may also include a main memory 408 (e.g., random access memory, read-only memory, etc.), and may also include a secondary memory 410. The secondary memory 410 may include the hard disk drive 412 and a removable storage drive 414, such as a floppy disk drive, a magnetic tape drive, an optical disk drive, a flash memory, etc.

The removable storage drive 414 may read from and/or write to the removable storage unit 418 in a well-known manner. The removable storage unit 418 may include a removable storage media that may be read by and written to by the removable storage drive 414. For example, if the removable storage drive 414 is a floppy disk drive or universal serial bus port, the removable storage unit 418 may be a floppy disk or portable flash drive, respectively. In one embodiment, the removable storage unit 418 may be non-transitory computer readable recording media.

In some embodiments, the secondary memory 410 may include alternative means for allowing computer programs or other instructions to be loaded into the computer system 400, for example, the removable storage unit 422 and an interface 420. Examples of such means may include a program cartridge and cartridge interface (e.g., as found in video game systems), a removable memory chip (e.g., EEPROM, PROM, etc.) and associated socket, and other removable storage units 422 and interfaces 420 as will be apparent to persons having skill in the relevant art.

Data stored in the computer system 400 (e.g., in the main memory 408 and/or the secondary memory 410) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 400 may also include a communications interface 424. The communications interface 424 may be configured to allow software and data to be transferred between the computer system 400 and external devices. Exemplary communications interfaces 424 may include a modem, a network interface (e.g., an Ethernet card), a communications port, a PCMCIA slot and card, etc. Software and data transferred via the communications interface 424 may be in the form of signals, which may be electronic, electromagnetic, optical, or other signals as will be apparent to persons having skill in the relevant art. The signals may travel via a communications path 426, which may be configured to carry the signals and may be implemented using wire, cable, fiber optics, a phone line, a cellular phone link, a radio frequency link, etc.

The computer system 400 may further include a display interface 402. The display interface 402 may be configured to allow data to be transferred between the computer system 400 and external display 430. Exemplary display interfaces 402 may include high-definition multimedia interface (HDMI), digital visual interface (DVI), video graphics array (VGA), etc. The display 430 may be any suitable type of display for displaying data transmitted via the display interface 402 of the computer system 400, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 408 and secondary memory 410, which may be memory semiconductors (e.g., DRAMs, etc.). These computer program products may be means for providing software to the computer system 400. Computer programs (e.g., computer control logic) may be stored in the main memory 408 and/or the secondary memory 410. Computer programs may also be received via the communications interface 424. Such computer programs, when executed, may enable computer system 400 to implement the present methods as discussed herein. In particular, the computer programs, when executed, may enable processor device 404 to implement the method illustrated by FIGS. 2a-2b, as discussed herein. Accordingly, such computer programs may represent controllers of the computer system 400. Where the present disclosure is implemented using software, the software may be stored in a computer program product and loaded into the computer system 400 using the removable storage drive 414, interface 420, and hard disk drive 412, or communications interface 424.

The processor device 404 may comprise one or more modules or engines, such as the modules 160-172, configured to perform the functions of the computer system 400. Each of the modules or engines may be implemented using hardware and, in some instances, may also utilize software, such as corresponding to program code and/or programs stored in the main memory 408 or secondary memory 410. In such instances, program code may be compiled by the processor device 404 (e.g., by a compiling module or engine) prior to execution by the hardware of the computer system 400. For example, the program code may be source code written in a programming language that is translated into a lower level language, such as assembly language or machine code, for execution by the processor device 404 and/or any additional hardware components of the computer system 400. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 400 to perform the functions disclosed herein. It will be apparent to persons having skill in the relevant art that such processes result in the computer system 400 being a specially configured computer system 400 uniquely programmed to perform the functions discussed above.

Techniques consistent with the present disclosure provide, among other features, systems and methods for authentication of a client device using a hash chain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope

What is claimed is:

1. A method for rendering scrolling captions for media content, the method comprising:
   receiving, by a computing device, a first request to display a first line of text associated with a media file, the first line of text being caption data for a first portion of audio content of the media file;
   generating, by the computing device, a framebuffer object (FBO), the FBO being an active framebuffer for the media file;
   generating, by the computing device, a first texture per-line (TPL) for the first line of text;
   drawing, by the computing device, one or more glyphs on the first TPL;
   rendering, by the computing device, the first TPL in a first position of the FBO;

displaying, by the computing device, the first TPL on a display at the first position;

receiving, by the computing device, a second request to display a second line of text associated with the media file, the second line of text being caption data for a second portion of the audio content of the media file;

generating, by the computing device, a second texture per-line (TPL) for the second line of text;

drawing, by the computing device, one or more glyphs on the second TPL;

rendering the first TPL in a second position and the second TPL in the first position; and displaying the second TPL on the display in the first position and the first TPL in the second position.

2. A method according to claim 1, wherein the first TPL and the second TPL are bound to the FBO.

3. A method according to claim 1, wherein the first TPL and the second TPL are generated using OpenGL.

4. A method according to claim 1, wherein the displaying the second TPL on the display in the first position and the first TPL in the second position comprises:

scrolling, by the computing device, the first TPL from the first position to the second position on the display.

5. A method according to claim 1, wherein the second position is partially visible on the display.

6. A method according to claim 1, comprising:

storing, by the computing device, the first TPL and the second TPL in an active TPL list, the active TPL list stored in a memory of the computing device.

7. A method according to claim 6, comprising:

determining, by the computing device, the second position is not visible on the display; and removing, by the computing device, the first TPL from the active TPL list.

8. A system for rendering scrolling captions for media content, the system comprising:

a processor configured to receive a first request to display a first line of text associated with a media file, the first line of text being caption data for a first portion of audio content of the media file;

the processor configured to generate a framebuffer object (FBO), the FBO being an active framebuffer for the media file, the processor configured to generate a first texture per-line (TPL) for the first line of text;

a graphics processing unit of the processor configured to:

draw one or more glyphs on the first TPL;

render the first TPL in a first position of the FBO;

a display unit configured to display the first TPL on a display at the first position;

the processor configured to receive a second request to display a second line of text associated with the media file, the second line of text being caption data for a second portion of the audio content of the media file;

the processor configured to generate a second texture per-line (TPL) for the second line of text;

the graphics processing unit of the processor configured to:

draw one or more glyphs on the second TPL;

render the first TPL in a second position and the second TPL in the first position; and the display unit configured to display the second TPL on the display in the first position and the first TPL in the second position.

9. A system according to claim 8, wherein the first TPL and the second TPL are bound to the FBO.

10. A system according to claim 8, wherein the first TPL and the second TPL are generated using OpenGL.

11. A system according to claim 8, wherein the display unit is configured to display the second TPL on the display in the first position and the first TPL in the second position comprises:

the processor configured to scroll the first TPL from the first position to the second position on the display.

12. A system according to claim 8, comprising:

a memory configured to store the first TPL and the second TPL in an active TPL list, the active TPL list.

13. A system according to claim 12, comprising:

the processor configured to determine the second position is not visible on the display; and the processor configured to remove the first TPL from the active TPL list stored in the memory.

14. A computer program product for rendering scrolling captions for media content, the computer program product comprising:

a non-transitory computer-readable storage medium having program instructions embodied therewith, the program instructions executable by a computer to cause the computer to perform a method, comprising:

receiving, by a computing device, a first request to display a first line of text associated with a media file the first line of text being caption data for a first portion of audio content of the media file;

generating, by the computing device, a framebuffer object (FBO), the FBO being an active framebuffer for the media file;

generating, by the computing device, a first texture per-line (TPL) for the first line of text;

drawing, by the computing device, one or more glyphs on the first TPL;

rendering, by the computing device, the first TPL in a first position of the FBO;

displaying, by the computing device, the first TPL on a display at the first position;

receiving, by the computing device, a second request to display a second line of text associated with the media file, the second line of text being caption data for a second portion of the audio content of the media file;

generating, by the computing device, a second texture per-line (TPL) for the second line of text;

drawing, by the computing device, one or more glyphs on the second TPL;

rendering the first TPL in a second position and the second TPL in the first position; and displaying the second TPL on the display in the first position and the first TPL in the second position.

15. A computer program product according to claim 14, wherein the first TPL and the second TPL are bound to the FBO.

16. A computer program product according to claim 14, wherein the first TPL and the second TPL are generated using OpenGL.

17. A computer program product according to claim 14, wherein the displaying the second TPL on the display in the first position and the first TPL in the second position comprises:

scrolling, by the computing device, the first TPL from the first position to the second position on the display.

18. A computer program product according to claim 14, wherein the second position is partially visible on the display.

19. A computer program product according to claim 14, comprising:

storing, by the computing device, the first TPL and the second TPL in an active TPL list, the active TPL list stored in a memory of the computing device.

20. A computer program product according to claim 19, comprising:
  determining, by the computing device, the second position is not visible on the display; and
  removing, by the computing device, the first TPL from the active TPL list.

* * * * *